(12) United States Patent
Kennon

(10) Patent No.: US 6,173,767 B1
(45) Date of Patent: Jan. 16, 2001

(54) PRESSURE RELEASE DEVICE FOR COOLING COILS

(75) Inventor: Douglas Kennon, Owatonna, MN (US)

(73) Assignee: SGCM Partnership, L.P., Malvern, PA (US)

( * ) Notice: Under 35 U.S.C. 154(b), the term of this patent shall be extended for 0 days.

(21) Appl. No.: 08/729,621

(22) Filed: Oct. 11, 1996

Related U.S. Application Data

(60) Provisional application No. 60/005,148, filed on Oct. 13, 1995.

(51) Int. Cl.[7] ................................................ F16L 3/04
(52) U.S. Cl. ........................ 165/278; 165/281; 165/150; 138/27; 137/71; 137/68.23; 285/201; 285/141.1; 220/203.08
(58) Field of Search .................... 165/278, 281, 165/150; 138/27; 137/71, 68.23, 68.24, 68.25, 68.26; 285/201, 205, 141.1, 222; 220/203.08

(56) References Cited

U.S. PATENT DOCUMENTS

| | | | |
|---|---|---|---|
| 443,873 | * 12/1890 | Snow | 137/68.23 |
| 1,018,354 | * 2/1912 | FairField | 285/205 |
| 1,125,063 | * 1/1915 | Colberg | 285/201 |
| 1,159,225 | 11/1915 | Howell . | |
| 1,274,988 | * 8/1918 | Chadwick | 285/205 |
| 1,573,157 | 2/1926 | Giddings, Jr. . | |
| 1,900,836 | 3/1933 | Merritt . | |
| 2,269,895 | * 1/1942 | Foster | 285/141.1 |
| 2,526,794 | 10/1950 | Andrews . | |
| 2,580,426 | * 1/1952 | Heigis | 137/68.23 |
| 2,915,216 | 12/1959 | Coffman . | |
| 2,975,983 | * 3/1961 | Niebling | 137/68.23 |
| 3,080,091 | 3/1963 | Philip . | |
| 3,090,433 | 5/1963 | Amorosi et al. . | |
| 3,319,657 | 5/1967 | Nyiri . | |
| 4,146,047 | * 3/1979 | Wood et al. | 137/68.26 |
| 4,269,214 | * 5/1981 | Forsythe et al. | 137/68.26 |
| 4,316,624 | * 2/1982 | Davlin | 285/141.1 |
| 4,549,565 | * 10/1985 | Short, III | 137/71 |
| 4,770,446 | * 9/1988 | Keller | 285/141.1 |
| 5,074,282 | 12/1991 | Reed . | |
| 5,213,378 | * 5/1993 | MacGregor | 285/141.1 |
| 5,697,546 | * 12/1997 | Cicioni | 165/42 |

FOREIGN PATENT DOCUMENTS

| | | | |
|---|---|---|---|
| 169433 | * 8/1934 | (CH) | 137/68.23 |
| 0023414 | * 4/1908 | (GB) | 285/222 |
| 0030022 | * 12/1911 | (GB) | 285/222 |
| 297270 | * 9/1928 | (GB) | 137/68.23 |
| 0501347 | * 2/1939 | (GB) | 285/222 |
| 39531 | * 3/1957 | (PL) | 137/68.23 |

* cited by examiner

Primary Examiner—John K. Ford
(74) Attorney, Agent, or Firm—Merchant & Gould PC

(57) ABSTRACT

A pressure relief device mounts to heat exchange coils having fluid flowing therethrough. A base has an orifice formed therethrough extending through an orifice in the coil to the interior of the coil. A cover attaches to the base with bolts or other attachment means. A diaphragm strip inserts between the cover and the base to close off the orifice in the base. An o-ring or other gasket may also be utilized to seal the structure. When a rupture through the diaphragm occurs due to pressure buildup, the diaphragm strip may be advanced to reclose the orifice.

9 Claims, 4 Drawing Sheets

PRESSURE RELEASE DEVICE FOR COOLING COILS

BACKGROUND OF THE INVENTION

This application claims the benefit of U.S. Provisional Application No. 60/005,148, filed Oct. 13, 1995.

FIELD OF THE INVENTION

The present invention is directed to a pressure relief device and, in particular, to a replaceable pressure relief device for use with heating and cooling coils.

PRIOR ART

Heating and cooling coils are well known for use in heat-exchange devices for cooling and/or heating. Such coils typically have a heat transfer fluid circulating therethrough to accept or dissipate heat. It can be appreciated that these coils may face temperature extremes and that the fluids in the coils may also face temperature highs and lows having a great differential. At extremely low temperatures, the problems encountered are especially troublesome, as fluids may freeze. Heat exchange fluids may also expand at high temperatures or otherwise cause pressure buildups in the coils. The pressure buildup may cause the coils to burst, causing irreparable harm and leading to replacement of the coils. This work is costly and requires labor intensive, in the field repairs.

To prevent pressure buildups and damage to the coils, freeze plugs and various other devices have been conceived for preventing coils from bursting. However, such devices typically are not easily installed or require expensive and complex procedures for the replacement of plugs and other pressure relief devices. In addition, the delicate nature of copper coils cannot easily support plugs so that removal of freeze plugs, which become corroded in place over time, may be difficult or impossible to accomplish, as the copper tubing may be crushed or punctured when gripped by a wrench or pliers. Should it be necessary to grip the tubing with a wrench or other tool to reset the pressure relief device, the delicate nature of copper tubing may lead to damaged coils. This defeats the objectives of the pressure relief device and may cause even greater damage to the heating and cooling coils. Another problem encountered with pressure relief devices for heating and cooling coils is a lack of space. Coils are often spaced closely together, making access to removable pressure relief devices very difficult or impossible if the pressure relief devices are too wide.

In addition to not adequately preventing damage, pressure relief devices may not provide a consistent and/or predictable pressure relief point. Therefore, it may be possible that the relief pressure occurs at different pressures at different points in the coil. These devices' lack of predictable and consistent burst pressures makes designing an optimum pressure relief device nearly impossible. The relief pressures are critical when thin walled copper tubing coil is used, as the relief pressure may be very close to the pressure which may damage the coil. With these designs, only some pressure relief devices may function properly so that it may be necessary to replace portions of the coil near pressure relief devices that do not burst at the desired pressure and allow damage to the coils.

It can be seen then that a new, improved pressure relief device is required for heating and cooling coils. Such a device should provide a simple and quick method of replacement should the pressure relief device be activated. Such a device should provide consistent and predictable pressure rupturing points so that the relief device is activated at the optimum pressure to protect the coil. In addition, such a device should be easily and cheaply manufactured and be sufficiently narrow to be easily installed while providing support points for tools in addition to the copper coil. The present invention addresses these as well as other problems associated with providing pressure relief for heating and cooling coils.

SUMMARY OF THE INVENTION

The present invention is directed to a pressure relief device and in particular, to a pressure relief device for heating and cooling coils which have a fluid circulated therethrough. Cooling coils often have pressure buildups due to freezing, fluid expansion and/or other complications. The coils often burst due to the increased pressure, requiring repair and/or replacement. The copper tubing typically used for such coils is difficult to grasp and handle without further damaging the coil. Therefore, pressure relief devices are utilized to eliminate damage and to decrease the equipment down time due to coil damage caused by pressure buildups.

According to the present invention, the pressure relief device has a mounting base attaching to a bend or header of the coil. The mounting base provides support for the pressure relief device. A cover removably attaches to the base and is tightenably connected thereto. In a first embodiment, the base includes an orifice extending therethrough to the interior of the coil. In this manner, pressure may be communicated through the coil and to the cover. Intermediate the cover and the base is held a rupturable membrane or diaphragm. The diaphragm is part of a strip which may be advanced to a usable portion when the diaphragm has been ruptured. With this configuration, upon rupturing, the diaphragm sheet may simply be advanced over the base to repair the coil. The cover attaches to the base with bolts on either side of the orifice. In addition, an o-ring or other gasket may be utilized with the base to provide a seal with the diaphragm strip.

The delicate nature of the coils and the damage which may occur is prevented by having a base which can be gripped with tools for removing and replacing the diaphragm strip. It can be appreciated that with the present invention, safe, inexpensive and quick repair can be easily accomplished when pressure buildups occur.

A second embodiment of the present invention includes a threadably connected cover which attaches to a base portion on a bend or header of the coil. A hex head or other tool grippable portion is permanently attached to the header below the threaded portion. A removable cover includes an upper portion having a diaphragm which ruptures upon interior coil pressure reaching a predetermined level. The cover includes a tool grippable portion so that a pair of wrenches, for example, may be used to grip the portion on the coil and remove the ruptured cover.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letter indicate corresponding elements throughout the several views.

DETAILED DESCRIPTION OF THE PREFERRED EMBODIMENT

Figure 1:
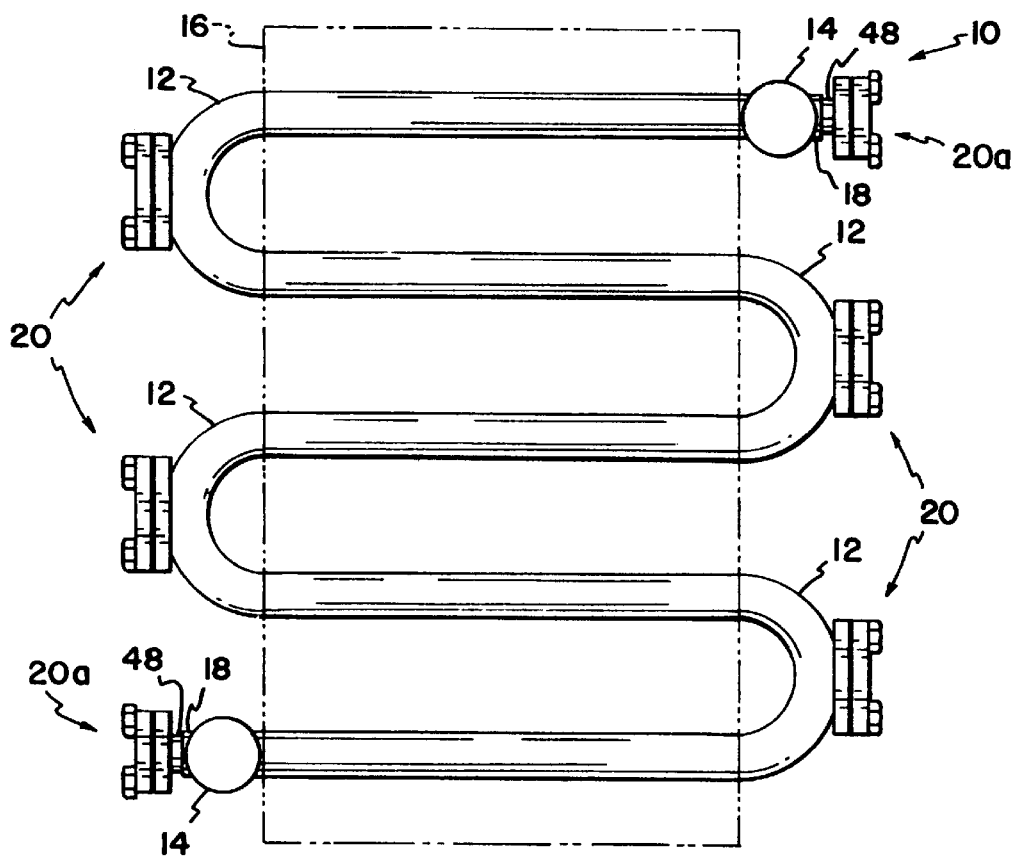
FIG. 1 shows a side elevational view of a heating and cooling coil including a first embodiment of pressure relief devices according to the principles of the present invention.

Referring now to the drawings, and in particular to FIG. 1, there is shown a heating and cooling coil, generally designated 10. The heating and cooling coil 10, may include serpentine tubing, often copper tubing, having heating or cooling fluid circulating therethrough for heat exchange. Depending on the application, the coil 10 may be utilized for either heating or cooling. In addition, as diagrammatically shown, a number of heat fins or other heat dissipating structure 16 may be utilized with the coil 10. It can be appreciated that although only a short portion of coil 10 is shown, typically the coil would have a greater number of bends and have a circulating system for returning fluid throughout the system. It can be appreciated that some coils may have headers 14 which may need to be capped with a pressure relief device, as explained hereinafter. A number of coils 10 may be aligned side by side in a densely packed configuration.

The coil 10 includes a number of devices 20 spaced along the coil 10 at coil bends 12 for preventing buildup of pressure, as explained hereinafter. The freeze plug type pressure relief devices designated 20a fit onto the coil headers 14. The pressure relief devices 20 and 20a operate in the same manner, as explained hereinafter, other than being mounted in a different location to the coil 10.

Figure 2:
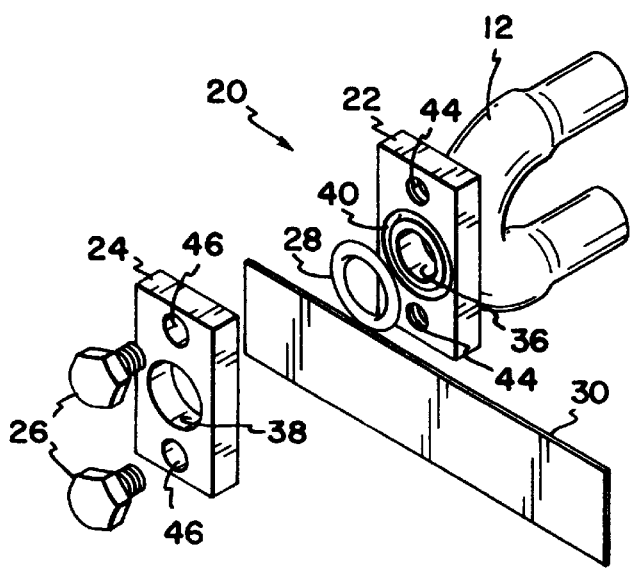
FIG. 2 shows an exploded perspective view of the pressure relief device shown in FIG. 1 mounted to a coil bend.

Referring now to FIG. 2, the freeze plug 20 typically mounts to one of the bends 12 in the coil. The pressure relief device 20 includes a brass base member 22 in a preferred embodiment which may be brazed or otherwise connected to the bend 12. The base 22 provides a mounting structure for the pressure relief device and structure for gripping with wrenches or other repair tools. Since the coil 10 is typically a thin walled copper tubing, the tubing cannot withstand pressure from gripping by a wrench or other device for mounting or repairing a pressure relief device. Therefore, the base 22 is mounted at the bend to provide added support structure. The base 22 includes an orifice 36 formed therein which is aligned with an orifice 34 formed in the coil bend 12. In this manner, increased pressure or expanding fluid or frozen fluid in the coil transmits through the orifices to the diaphragm strip 30, as explained hereinafter.

Figure 3:
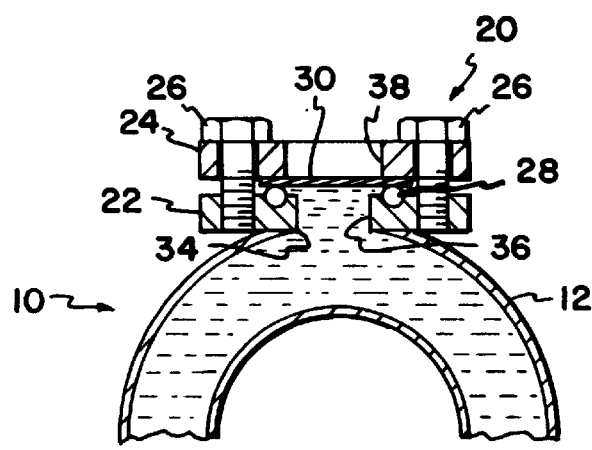
FIG. 3 shows a side sectional view of the pressure relief device shown in FIG. 2.
Figure 4:
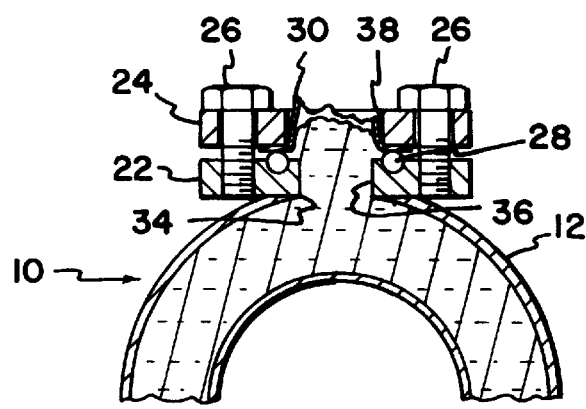
FIG. 4 shows a side sectional view of the pressure relief device shown in FIG. 3 with the membrane ruptured.

A cover member 24 fits against the base 22, as also shown in FIGS. 3 and 4. When the cover 24 is attached, the diaphragm strip 30 is pressed between the cover 24 and base 22. The base 22 is fitted with a recess 40 extending around the orifice 36 for receiving an o-ring 28. In this manner, the orifice 34 in the coil opens to a sealed chamber with the diaphragm strip 30. An orifice 38 is formed in the cover 24 to provide pressure release through the diaphragm strip 30 in case of a rupture due to pressure from the coil. The cover 24 mounts to the base 22 with bolts or other attachment members 26 inserting through orifices 46 in the cover and to threaded receiving portions 44 in the base 22 on either side of the orifice 36.

Figure 5:
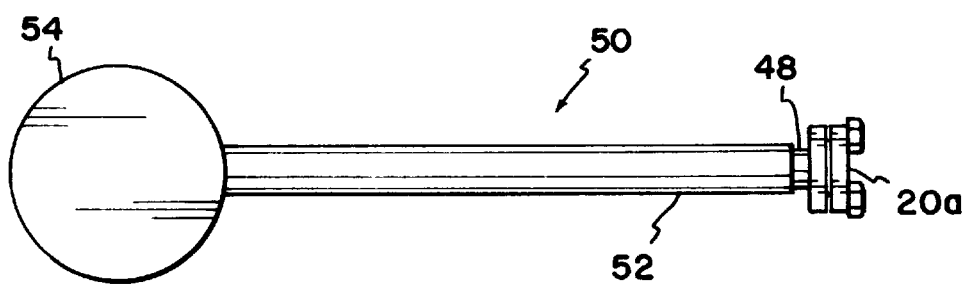
FIG. 5 shows a side elevational view of a steam distributing coil having a pressure relief device mounted to a header according to the principles of the present invention.

For the pressure relief devices 20a, which mount to a header 14, the base 22 is attached to a sleeve member 48 which extends normal to the lower portion of the base and aligned with the orifice 36. The sleeve 48 is tubular and has a diameter configured to fit inside mounting portions 18 of the headers 14, as shown in FIG. 1. As shown in FIG. 5, the freeze plug type pressure relief devices 20a may also be utilized with steam distributing coils 50. The steam distributing coil 50 includes a manifold 52 with a number of headers 54 extending outward from the manifold 52 accepting the sleeve portions 48 of the pressure relief devices 20a. Each of the headers 54 has a pressure relief device 20a mounted thereon to provide relief from pressure build up in the steam distributing coil 50.

In the normal operating condition, the coolant or other fluid in the coil 10 contacts the diaphragm strip 30, the base 22 at the orifice 36 and the o-ring 28, as shown in FIG. 3. It can be appreciated that the orifice 36 is aligned with the orifice 34 in the coil bend to provide a path for fluid and pressure to engage the diaphragm strip 30. The diaphragm strip 30 is pressed against the o-ring 28 and the base 36 by the cover member 24. The cover member 24 is retained against the strip 30 by bolts 26 threadably connecting to the base 22.

When the pressure in the coil 10 or 50 rises, the force against the diaphragm strip 30 increases. When the pressure rises to a point exceeding the strength of the diaphragm strip 30, the strip will burst, as shown in FIG. 4. This allows the fluid or other material to be forced out through the opening in the burst diaphragm strip 30 to relieve the pressure. In this manner, the pressure relief device 20 relieves the pressure within the coil 10 so that the coil 10 is not damaged. To repair the pressure relief device 20 or 20a so that the coil may operate properly, the bolts or other retaining members 26 are loosened so that the cover member 24 is not retaining the diaphragm strip 30 against the o-ring 28 and base member 22. When the cover 24 is loosened, the diaphragm strip 30 is freed and may be advanced. As the ruptured portion is pulled out of the way of the pressure relief device 20, it can be appreciated that another portion of the diaphragm strip 30 which has it integrity intact, can be moved to cover the orifices 36 and 34. It can be appreciated that as the bolts 26 are tightened down onto the newly moved portion of the diaphragm strip 30, a seal is formed between the diaphragm strip 30, the o-ring 28, and the base 22 by pressure from the cover 24. When the diaphragm strip has been advanced and the cover member 24 secured against the diaphragm strip 30, the pressure relief device 20 is ready for further use. It can be appreciated that with the present invention, commonly used copper tubing of the coil 10 will not need to be replaced.

It can also be appreciated that with the base 22 connected to one of the bends 12, or one of the headers 14, tools may be used to grip the base so that the bolts 26 or other tightening members may be loosened with damaging the coil 10. This becomes important when there are freezing conditions and other problems associated with ruptured diaphragm strips 30. It can also be appreciated that the present invention provides for a pressure relief device which can have a rupture point which can be easily varied by changing the thickness or the material of the diaphragm strip 30. Therefore, the rupture point can be matched so that it does not burst at too low of a pressure, yet burst before damage occurs to the coil 10. In addition, it can be appreciated that the present invention provides a very easy and cheap method for repairing burst pressure relief devices, as minimal time and effort is required to advance the diaphragm strip 30. Moreover, the bursting point can be easily determined by the thickness and type of material used in the diaphragm strip. Since the present invention does not require brazing or other compromising of the diaphragm strip material which may affect the burst point, the bursting pressure can be easily and reliably determined.

Referring now to FIGS. 6–9, there is shown a second embodiment of a pressure relief device, generally designated 60. The pressure relief device 60 includes a base portion 64 and a cap portion 62. The base portion 64 includes an exterior threaded upper section 68 and lower portion 66 having a hexagonal periphery. The base 64 is brazed, welded or otherwise connected to the bend 12 of the coil 10. The base 64 includes an orifice extending from the bend 12 of the coil 10 to the opening at the upper end of the threaded section 68.

Figure 8:
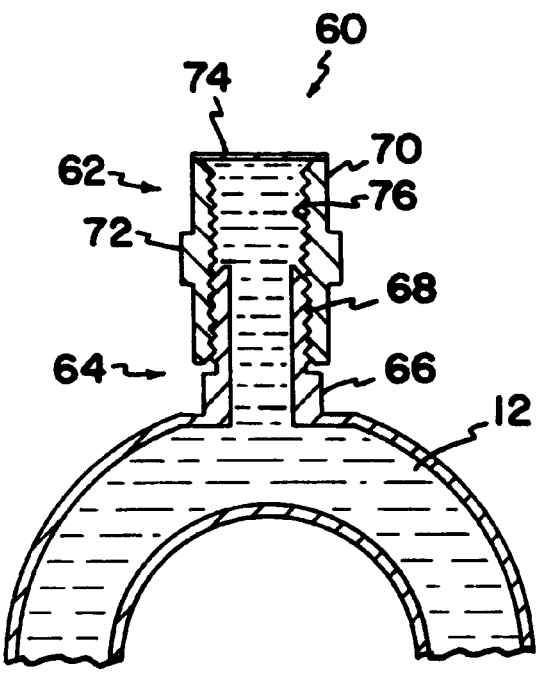
FIG. 8 shows a side sectional view of the pressure relief device shown in FIG. 7.
Figure 9:
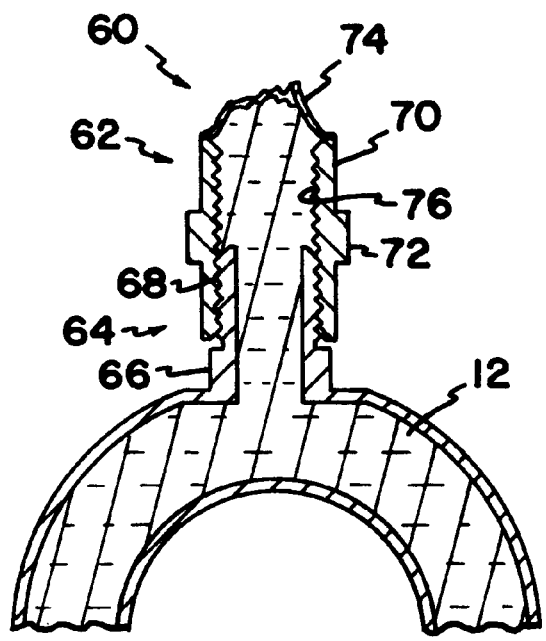
FIG. 9 shows a side sectional view of the pressure relief device shown in FIG. 7 with the membrane ruptured.

The cap 62 includes a cylindrical wall portion 70 having an interior threaded portion 76 as shown in FIGS. 8 and 9. A membrane 74 covers the top portion of the cap member 62. The membrane is a rupturable portion, as explained hereinafter. A tool receiving portion 72 includes a hexagonal periphery on the cylindrical cap member 62.

As shown in FIG. 8, the cap member 62 threadably mounts to the base 64. When connected, the pressure relief device 60 provides a pressure tight enclosed attachment to the bend 12.

Figure 7:
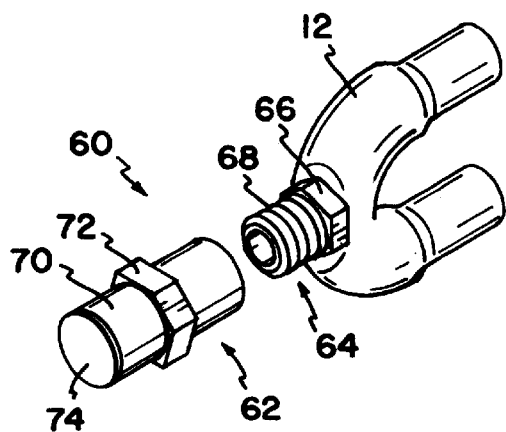
FIG. 7 shows an exploded perspective view of a pressure relief device shown in FIG. 6.

When pressure increases or the fluid expands, as shown in FIG. 9, the membrane 74 bursts. This allows the pressure within the coil 10 to dissipate and prevent damage to the coil 10. It can be appreciated that once the membrane 74 has ruptured, the cap member 62 requires replacement. Removal of the cap member 62 is performed by gripping the base portion 64 with a wrench or other tool and gripping the cap member 62 around the hex portion 72 with a second wrench or other tool. The cap member 62 is then rotated relative to the base 64 until it has been threadably removed, as shown in FIG. 7.

Once the ruptured cap member 62 has been removed, a new cap member 62 with the intact membrane 74 is replaced onto the coil 10. The cap member 62 is threadably tightened onto the base 64 utilizing wrenches, sockets or other tools adapted for gripping the hex portions. It can be appreciated that with the second embodiment, the base 64 can be gripped and supported by a tool rather than having to attempt to grip the coil 10 itself. This method provides for easier and safer removal with little fear of damage to the coil 10.

Figure 6:
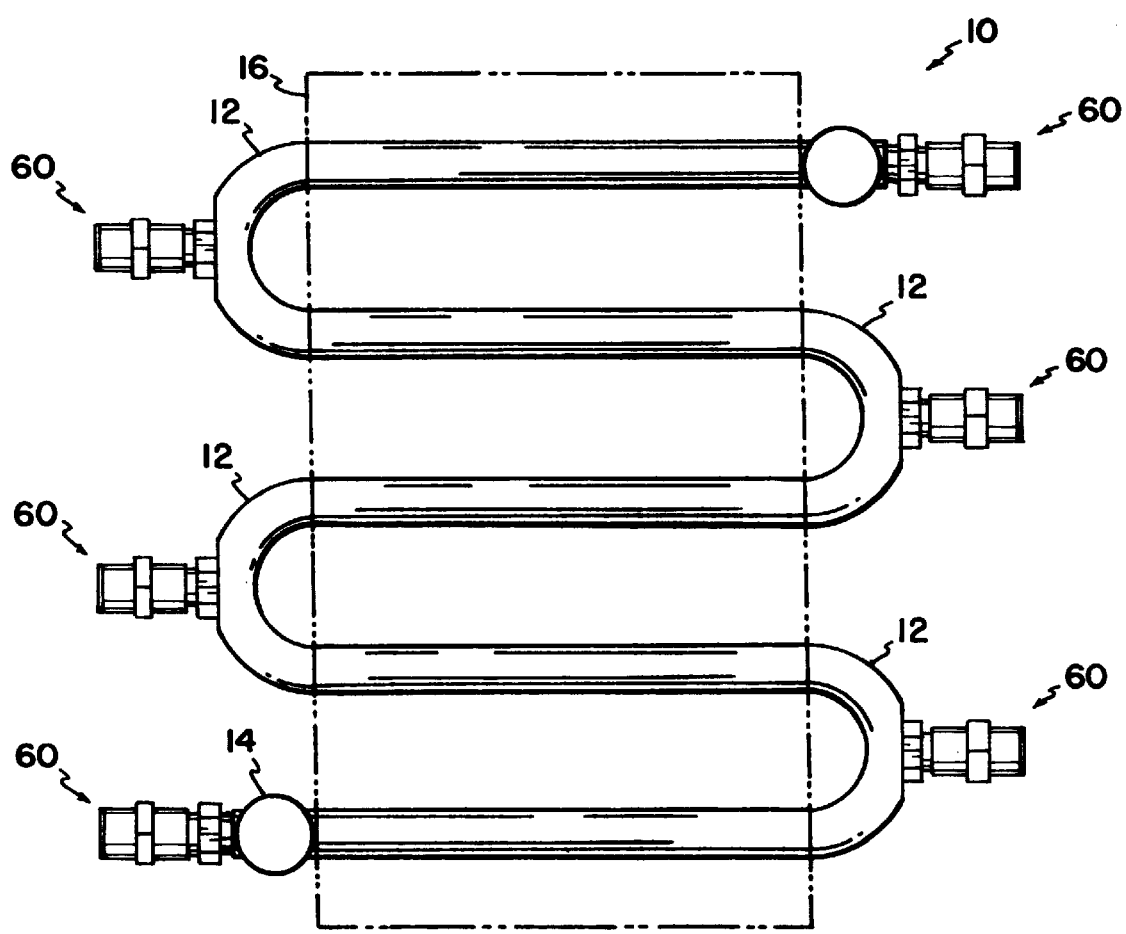
FIG. 6 shows a side elevational view of a heating and cooling coil including a second embodiment of pressure relief devices according to the principles of the present invention.

As shown in FIG. 6, pressure relief device 68 also attaches to a header 14 in a manner similar to the pressure relief device 60. The only difference being the positioning of the relief device on a header 14 rather than at a coil bend 12.

Since coils 10 are often densely configured with little space between adjacent parallel coil sections, there is very little space for a pressure relief device. Therefore, the width of a pressure relief device must be minimized so that such devices may be mounted on adjacent bends 12 without impinging on the next devices. It can be appreciated that the devices 20 and 60 have a width approximately equal to the outside diameter of the tubing of the coil 10, providing for use with closely winding coils.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A heating and cooling coil having a pressure relief apparatus, the apparatus comprising:

a coil including a plurality of bends and a fluid passage, wherein a first one of the bends includes a flattened portion at its apex;

a first member integrally bonded to the flattened portion, wherein the first member includes a bore formed therethrough to the fluid passage, the first member including a distal threaded portion, and a tool support portion having a plurality of planar sections disposed about a periphery of the first member;

a threaded cover member removably mounted on the first member and having an integrally attached rupturable membrane aligned with the bore.

2. A heating and cooling coil according to claim 1, wherein the tool support portion of the first member comprises planar sections defining a hexagonal periphery.

3. A heating and cooling coil according to claim 1, wherein the first member includes male threads and the cover member includes complementary female threads.

4. A heating and cooling coil according to claim 3, wherein the rupturable membrane has an area exposed to the bore substantially equal to a cross-sectional area of the bore.

5. A heating and cooling coil according to claim 1, wherein the cover member includes a tool support portion having a periphery defining a plurality of planar sections.

6. A heating and cooling coil having a pressure relief apparatus, the apparatus comprising:

a coil having a plurality of bends and a fluid passage;

a first member integrally bonded externally to a first bend of the coil, wherein the first member includes a bore formed therethrough to the fluid passage, the first member including a distal threaded portion, and a tool support portion abutting the first bend and having a plurality of planar sections disposed about its periphery;

a threaded cover member removably mounted on the first member and having an integrally attached rupturable membrane aligned with the bore.

7. A heating and cooling coil according to claim 6, wherein the planar sections define a hexagonal periphery.

8. A heating and cooling coil according to claim 6, wherein the first member includes male threads and the cover member includes complementary female threads.

9. A heating and cooling coil according to claim 6, wherein the cover member includes a periphery defining a plurality of planar sections.

* * * * *